United States Patent
Hirayama et al.

(10) Patent No.: US 7,033,686 B2
(45) Date of Patent: Apr. 25, 2006

(54) PERPENDICULAR MAGNETIC RECORDING MEDIUM AND METHOD OF MANUFACTURING IT

(75) Inventors: Yoshiyuki Hirayama, Kokubunji (JP); Ichiro Tamai, Odawara (JP); Takayuki Ichihara, Tokyo (JP); Hiroyuki Nakagawa, Yokohama (JP); Hiroaki Nemoto, Oiso (JP); Mineaki Kodama, Odawara (JP); Ikuko Takekuma, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

(21) Appl. No.: 10/701,603

(22) Filed: Nov. 6, 2003

(65) Prior Publication Data

US 2004/0191571 A1    Sep. 30, 2004

(30) Foreign Application Priority Data

Mar. 28, 2003  (JP)  ............................ 2003-089689

(51) Int. Cl.
G11B 5/66 (2006.01)
G11B 5/70 (2006.01)

(52) U.S. Cl. ..................................... 428/832
(58) Field of Classification Search ............ 428/694 T, 428/694 TS, 694 TM, 900, 693, 832, 832.1, 428/831, 831.2; 427/128, 131
See application file for complete search history.

(56) References Cited

U.S. PATENT DOCUMENTS

| | | | |
|---|---|---|---|
| 6,555,252 B1 * | 4/2003 | Sellmyer et al. | 428/668 |
| 6,682,826 B1 * | 1/2004 | Shimizu et al. | 428/611 |
| 6,723,458 B1 * | 4/2004 | Shimizu et al. | 428/694 TS |
| 6,794,028 B1 * | 9/2004 | Uwazumi et al. | 428/336 |
| 2003/0157374 A1 * | 8/2003 | Kato et al. | 428/694 TC |
| 2004/0001975 A1 * | 1/2004 | Hikosaka et al. | 428/694 BA |

FOREIGN PATENT DOCUMENTS

| | | | |
|---|---|---|---|
| JP | 07311929 A | * | 11/1995 |
| JP | 08255342 A | * | 10/1996 |
| JP | 2002197630 A | * | 7/2002 |
| JP | 2002334424 A | * | 11/2002 |
| JP | 2002342908 A | * | 11/2002 |

* cited by examiner

*Primary Examiner*—Holly Rickman
(74) *Attorney, Agent, or Firm*—Antonelli, Terry, Stout and Kraus, LLP.

(57) ABSTRACT

Disclosed are a perpendicular magnetic recording medium with lower medium noise, insusceptible to thermal fluctuation and high recording resolution and a method of manufacturing it. As the step of forming a metal layer at the time of forming a recording layer on a non-magnetic substrate via a plurality of underlayers and the step of forming an oxide layer with an average thickness of 0.2 nm or less are repeated, the crystal grains are magnetically isolated without disturbing the orientation of the crystal grain of the recording layer of the perpendicular magnetic recording medium or without degrading the magnetic characteristic of the crystal grain of the recording layer.

5 Claims, 5 Drawing Sheets

PERPENDICULAR MAGNETIC RECORDING MEDIUM AND METHOD OF MANUFACTURING IT

BACKGROUND OF THE INVENTION

The present invention relates to a perpendicular magnetic recording medium and a method of manufacturing it.

DESCRIPTION OF THE RELATED ART

As the amount of information which is handled daily increases with the advancement of the information society, there is a growing demand for a larger capacity for magnetic memory devices. To meet the demand, great efforts are being made to develop high-sensitivity magnetic heads and low-noise magnetic recording media or the like. In case of the longitudinal magnetic recording systems that have been made into a practical use at present, the magnetizations recorded adjacent to each other on a medium are oriented in the opposite directions. To increase the linear recording density, therefore, it is necessary to increase the coercivity of the recording layer and reduce the thickness of the recording layer.

An increase in the coercivity of the recording layer however raises the problem of an insufficient writing performance of the recording head and a reduction in the thickness of the recording layer raises the problem that recorded information may be lost due to the thermal magnetization decay. Those problems make it difficult to improve the recording density using the existing longitudinal magnetic recording system.

A perpendicular magnetic recording system has been studied as means for overcoming the problems. As the perpendicular magnetic recording system do not have adjoining magnetizations oriented in the opposite directions, the high density recording state is stable and the system seems substantially suitable for high density recording. Further, combining the perpendicular magnetic recording system with a double layer perpendicular magnetic recording medium which has a single pole type recording head and a soft magnetic underlayer can increase the recording efficiency and can cope with an increase in the coercivity of the recording layer. To realize high density recording using the perpendicular magnetic recording system, however, a perpendicular magnetic recording medium having lower noise and insusceptible to thermal magnetization decay should be developed.

As the recording layer of a perpendicular magnetic recording medium, a Co—Cr—Pt base alloy film which has been put to a practical use in a longitudinal magnetic recording medium, a super lattice film having the lamination of a Co layer and Pd layer with high magnetic anisotropy and the like are being studied. To reduce the noise of media using those recording layers and improve the thermal magnetization decay characteristic thereof, it is important to make crystal grains constituting each recording layer finer, uniform and magnetically isolated.

In case of the longitudinal magnetic recording medium using the Co—Cr—Pt base alloy film as the recording layer, a low noise characteristic is acquired by forming fine and magnetically isolated crystal grains by using the Cr segregation to the crystal grain boundary. In case of the perpendicular magnetic recording medium, however, the crystal grains of the recording layer have such a structure that the c-axis of the hexagonal close-pack structure is aligned in the direction perpendicular to the film surface the crystal orientations of the crystal grains in the longitudinal direction differ only slightly. Therefore, the crystal grains are combined with one another and become larger in the process of forming the recording layer or insufficient Cr segregation of the grain boundary makes the magnetic isolation of the crystal grains insufficient. This makes it difficult to acquire a low-noise characteristic.

As a scheme of accelerating the magnetic isolation of the crystal grains of the recording layer, addition of oxygen or an oxide is effective. For example, Japanese Patent Laid-Open No. 311929/1995 (Patent Document 1) discloses a longitudinal magnetic recording medium which has $SiO_2$ added to a Co—Ni—Pt alloy. Japanese Patent Laid-Open No. 255342/1996 (Patent Document 2) discloses a method which performs a heat treatment after laminating a non-magnetic film of $SiO_2$ or the like and a ferromagnetic film in order.

With regard to a perpendicular magnetic recording medium, for example, Japanese Patent Laid-Open No. 2002-197630 (Patent Document 3) discloses a medium which has 30 at % of oxygen added to a Co—Pt—Cr alloy. Japanese Patent Laid-Open No. 2002-342908 (Patent Document 4) discloses a medium which has 8 at % or greater and 16 at % or less of an Si oxide added to a Co—Pt—Cr alloy. In every case, the magnetic crystal grains are isolated by adding a lot of oxygen or oxide. This seems to be because it is difficult to isolate the magnetic crystal grains with addition of a slight amount of oxide. However, the addition of a large amount of oxygen or oxide raises another problem that the crystal orientation of the magnetic crystal grains is disturbed and oxygen or the oxide may be mixed inside the magnetic crystal grains, so that the desired magnetic characteristic and recording and reading characteristics cannot be acquired.

As another scheme of accelerating the magnetic isolation of the crystal grains of the recording layer, it is effective to control the crystal growth of the recording layer by an intermediate layer located under the recording layer. For example, one may think isolating the crystal grains of the intermediate layer in order to isolate the crystal grains of the recording layer. Japanese Patent Laid-Open No. 2002-334424 (Patent Document 5) discloses an orientation control film which has 20 at % of $SiO_2$ added to Ru. This case also should face the possible degradation of the crystal orientation as a result of adding a lot of oxide.

SUMMARY OF THE INVENTION

Acquisition of a perpendicular magnetic recording medium which can ensure high density recording requires a new technique to magnetically isolate the crystal grains of the recording layer without disturbing the orientation of the crystal grains of the recording layer and without degrading the magnetic characteristic of the crystal grains of the recording layer.

Accordingly, it is an object of the invention to magnetically isolate the crystal grains of the recording layer of a perpendicular magnetic recording medium without disturbing the orientation of the crystal grains of the recording layer and without degrading the magnetic characteristic of the crystal grains of the recording layer. That is, the invention aims at providing a perpendicular magnetic recording medium which has lower medium noise and high recording resolution and is insusceptible to thermal fluctuation. It is another object of the invention to provide a method of manufacturing the perpendicular magnetic recording medium.

To achieve the objects, a perpendicular magnetic recording medium according to the invention, which has a recording layer provided on a substrate via an underlayer, is characterized mainly in that the recording layer is comprised of crystal grains essentially consisting of Co and Pt or Pd and grain boundaries consisting of non-magnetic elements and oxygen, in those elements which constitute the grain boundaries, an amount of content of the non-magnetic element contained most in the grain boundaries besides oxygen over the entire recording layer is 1 at % or greater and 4.5 at % or less, and a ratio $H_n/H_c$ of a nucleation field for magnetic reversal $H_n$ to coercivity $H_c$ of the recording layer is 0 or greater and 0.5 or less.

Alternatively, a perpendicular magnetic recording medium according to the invention, which has a recording layer provided on a substrate via an underlayer, is characterized mainly in that the underlayer is comprised of crystal grains essentially consisting of Ru and grain boundaries consisting of non-magnetic elements and oxygen, in those elements which constitute the grain boundaries, an amount of content of the non-magnetic element contained most in the grain boundaries besides oxygen over the entire recording layer is 1 at % or greater and 4.5 at % or less, and a ratio $H_n/H_c$ of a nucleation field for magnetic reversal $H_n$ to coercivity $H_c$ of the recording layer is 0 or greater and 0.5 or less.

Further, according to the invention, there is provided a method of manufacturing a perpendicular magnetic recording medium having a recording layer provided on a substrate via an underlayer, which is characterized by including the steps of forming a metal layer and forming an oxide layer with an average thickness of 0.2 nm or less in a process of forming said recording layer.

Alternatively, a method of manufacturing a perpendicular magnetic recording medium according to the invention is characterized by including the steps of forming a metal layer and forming an oxide layer with an average thickness of 0.2 nm or less in a process of forming said underlayer.

It is preferable that the step of forming the metal layer and the step of forming an oxide layer should be repeated plural number of times in a process of forming said recording layer. It is also preferable that the step of forming the metal layer and the step of forming an oxide layer should be repeated plural number of times in a process of forming said underlayer.

DETAILED DESCRIPTION OF THE PREFERRED EMBODIMENT

A perpendicular magnetic recording medium to which the invention is adapted will be described below.

One feature of the invention, which is a method of manufacturing a perpendicular magnetic recording medium having a recording layer provided on a non-magnetic substrate via a plurality of underlayers, is a method of forming the recording layer by repeating at least one step of forming a metal film and a step of forming an oxide layer with the average thickness set to 0.2 nm or less.

Further, an intermediate layer located under the recording layer is formed by repeating at least one step of forming a metal film and a step of forming an oxide layer with the average thickness set to 0.2 nm or less.

One possible scheme of magnetically isolating the crystal grains of the recording layer is to add an oxide in the recording layer or the intermediate layer. The prior art requires a lot of oxide and brings about the problem of degrading the crystal orientation and magnetic characteristic.

Studying the problem, the present inventors discovered that forming an oxide layer with an average thickness of 0.2 nm or less on the top surface of a metal film which has upheavals by the period of the crystal grain size could bury the crystal grain boundary portion in the recess portions of the metal film by priority and allow the projecting portions of the metal film to remain as they were without the oxide covering the top surface of the metal film.

The average thickness is the designed thickness that is computed from the sputtering power and the sputtering time. The average thickness is therefore in such a range that the oxide layer does not become a continuous film when the thickness is less than a one-atom layer.

In case where the lamination of such a metal film and a super thin oxide layer is repeated, the oxide keeps forming the grain boundary while the metal film is formed continuously at the projecting portions, so that the metal film is formed as crystal grains with a columnar structure without degradation of the crystal orientation and subdivision in the thickness direction. As the oxide layer and the metal film are formed separately, there is no worry about the mixture and the magnetic characteristic is not degraded when the metal film is of a magnetic substance.

In case where the average thickness of the oxide layer is made greater than 0.2 nm, the oxide layer covers most of the top surface of the metal film. In this case, not only the crystal orientation of the metal film is degraded but also the crystal grains are subdivided in the thickness direction. In case where the metal film is of a magnetic substance, the magnetic reversal units are reduced drastically and the coercivity becomes significantly lower. The effect of the invention is prominent when $SiO_2$ is used for the oxide layer.

As the metal film, an alloy essentially consisting of Co and Pt or Pd demonstrates a reliable effect in case where it is used for the recording layer and Ru demonstrates a reliable effect in case where it is used for the recording layer.

In case where metal films and super thin oxide layers are alternately formed and an oxide is added, the suitable amount of the additive is 1 mol % or greater and 4.5 mol % or less. That is, in case where $SiO_2$ is to be added, it is necessary to set the Si content to 1 at % or greater and 4.5 at % or less. If an oxide is formed beyond this range, the oxide becomes excessive, which would subdivide the crystal grains of the metal film in the thickness direction.

In consideration of the fact that a minimum of 5 mol % of oxide is needed in case of isolating the crystal grains of the metal film by mixing an oxide in the metal film, the use of the invention can efficiently form the crystal grain boundary of the metal film with a fewer amount of oxide. Therefore, mixing of an oxide in the metal film hardly occurs so that the ideal characteristic can be maintained without degradation of the magnetic characteristic in case where the metal film is of a magnetic substance.

The magnetic characteristic and recording and reading characteristics of the magnetic recording medium prepared in the above-described manner were evaluated. It was found that in case where metal films and super thin oxide layers were alternately formed, 1 mol % or greater and 4.5 mol % or less of the additive ensured an excellent medium S/N and the coercivity $H_c$ of 240 kA/m or more and $H_n/H_c$ of 0.5 or less for the nucleation field for magnetic reversal (hereinafter called "magnetic reversal nucleation field") $H_n$.

In case where the amount of additive is increased above the aforementioned range, even a medium having an oxide added by mixture can satisfy the aforementioned conditions for the magnetic characteristic. It is to be noted however that the thermal stability in the case of the mixture formation is apparently inferior to that in the case of the alternate formation. Particularly, a big difference is seen when the thermal magnetization decay characteristic is measured at the temperature raised to 70 degrees. It seems that mixture of an oxide into the magnetic substance is the cause for the lower thermal stability. The aforementioned conditions for $H_c$ and $H_n$ appear to be indices for obtaining good medium S/N. If the isolation of the crystal grains is sufficient, $H_c$ becomes large and the inclination of the Kerr loop in the vicinity $H_c$ becomes smaller, resulting in smaller $H_n/H_c$. Even when the isolation of the crystal grains is insufficient, if the magnetic anisotropy is large, the coercivity becomes larger but the inclination of the Kerr loop in the vicinity $H_c$ becomes greater, resulting in larger $H_n/H_c$.

Even when the isolation of the crystal grains is sufficient and the inclination of the Kerr loop in the vicinity $H_c$ is small, however, if the magnetic anisotropy is small, $H_n/H_c$ becomes larger. In this case, however, the anisotropy magnetic field is large, which brings about a problem of the overwrite properties and results in a poor medium S/N.

The embodiment of the invention will be described below in detail referring to the accompanying drawings.

EXAMPLE 1

The perpendicular magnetic recording media of this example were formed by using a sputtering system (C-3010), a manufacture of ANELVA Corporation. This sputtering system comprises ten process chambers and a single substrate loading chamber which are independently degased. After every process chamber was degased to the vacuum of $1 \times 10^{-5}$ Pa or less, a carrier having a substrate mounted thereon was moved into each process chamber, the processes were executed in order.

Magnetron sputter cathodes of a magnetic rotation type were disposed in the sputtering process chambers and film deposition was performed using a target with a diameter of 110 mm. A metal film and a carbon film were formed by DC sputtering and an oxide film by RF sputtering. A special cathode called a rotating cathode was disposed in one sputtering process chamber and multilayers were formed using this cathode.

As three cathodes power given to which can be controlled independently of the rotating cathode are revolved in front of the substrate, the formation of the multilayer can be carried out easily. The revolution speed is adjustable and the maximum speed is 100 revolutions per minute. The diameter of the target is 90 mm, and RF sputtering as well as DC sputtering can be employed. A lamp heater was provided in the heating process chamber and the substrate temperature was controlled by adjusting the given power. The substrate temperature was checked by using a radiation thermometer.

Figure 1A:
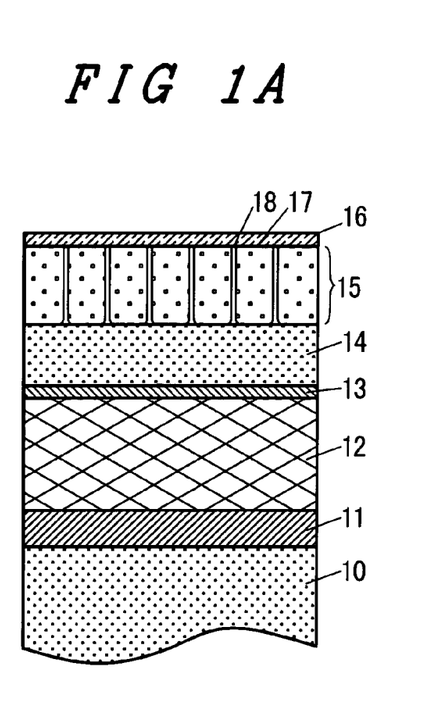
FIGS. 1A and 1B are schematic diagrams showing the cross-sectional structures of a perpendicular magnetic recording medium according to Example 1, FIG. 1A schematically showing the structure which is actually formed while FIG. 1B schematically shows an expected structure according to the manufacturing method of the invention.

FIG. 1A is a diagram showing one example of the perpendicular magnetic recording medium according to the invention and the cross-sectional structure. The following will describe the procedures of preparing this medium. As a substrate 10, crystal glass with a thickness of 0.635 mm and a diameter of 65 mm was used.

First, a seed layer 11 with a thickness of 30 nm made of an alloy of Ni, 37.5 at % of Ta and 10 at % of Zr was formed on the substrate 10, then a soft magnetic underlayer 12 with a thickness of 300 nm made of an alloy of Fe, 8 at % of Ta and 12 at % of C was formed. Then, the structure was heated for 12 seconds using the lump heater with applying the power of 1600 W. The substrate temperature achieved then was about 450° C.

Next, the substrate was cooled down until the substrate temperature became 100° C. or lower, and a Ta intermediate layer 13 with a thickness of 1 nm and an Ru intermediate layer 14 with a thickness of 20 nm were formed, on which a recording layer 15 with a thickness of 14 nm made of an alloy of Co, 13 at % of Cr and 14 at % of Pt and an Si oxide and further a carbon protective layer 16 with a thickness of 4 nm were formed. The thicknesses of those layers were average thicknesses and were adjusted by the sputtering time and the power given.

Argon was used as a sputtering gas and the pressure was set to 0.5 Pa at the time of forming a Fe—Ta—C alloy film, 1.0 Pa at the time of forming a Ni—Ta—Zr alloy film and a Ta film and 2.2 Pa at the time of forming the Ru film and at the time of forming the recording layer. In case of forming the recording layer, an argon-oxygen gas having 1% of oxygen mixed into argon was used. After the formation of up to the carbon protective layer, the medium was removed from the chamber and an organic lubricant was applied to its surface to form a lubricant layer. The rotating cathode was used in forming the recording layer.

Figure 1B:
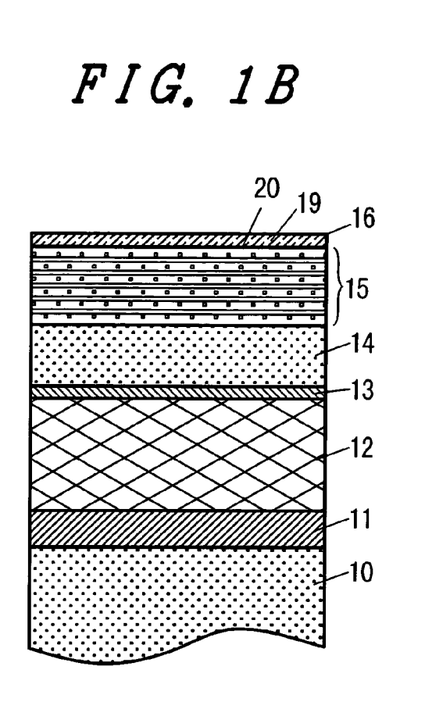

The cathodes to which an alloy target of Co, 13 at % of Cr and 14 at % of Pt and an SiO$_2$ target were attached were discharged by DC sputtering and RF sputtering, respectively, and were revolved in front of the substrate, thereby alternately forming the Co—Cr—Pt alloy film and SiO$_2$ film. That is, the cross-sectional structure of the medium that is simply expected from the forming method is shown in FIG. 1B. In this example, the ratio of the designed thicknesses of the Co—Cr—Pt alloy film and the SiO$_2$ film was set in such a way that SiO$_2$ in the recording layer became 12.5 vol %.

As a sample to be compared with Example 1, a perpendicular magnetic recording medium which differs from Example 1 only in the method of forming the recording layer and is the same in the other film structures and process conditions was prepared as Comparative Example 1. The recording layer of Comparative Example 1 was formed by RF sputtering using a mixed target which had 12.5 mol % of SiO$_2$ mixed into the alloy of Co, 13 at % of Cr and 14 at % of Pt attached to an ordinary cathode, not the rotating cathode. That is, the recording layer with an oxide added by mixture formation, not alternate formation, was prepared.

Figure 2:
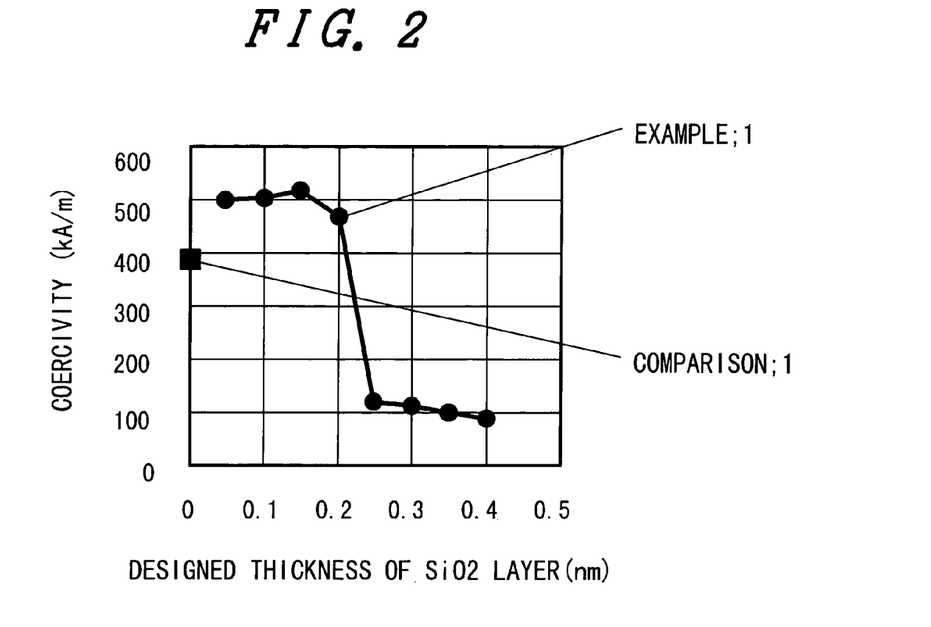
FIG. 2 is a diagram showing the relationship between the designed thicknesses of $SiO_2$ layers and coercivities of perpendicular magnetic recording media according to Example 1 and Comparative Example 1.

The results of plotting the measured coercivities of the recording layers of the media according to Example 1 and Comparative Example 1 are shown in FIG. 2 and the designed thicknesses of the SiO$_2$ film and Co—Cr—Pt alloy film, the coercivity H$_c$ and the magnetic reversal nucleation field H$_n$ of the recording layer are shown in Table 1.

TABLE 1

|  | Designed thickness of SiO$_2$ film (nm) | Designed thickness of CoCrPt layer (nm) | Coercivity H$_c$ (kA/m) | Magnetic reversal nucleation field H$_n$ (kA/m) |
|---|---|---|---|---|
| Example 1 | 0.05 | 0.40 | 498 | 168 |
|  | 0.10 | 0.79 | 506 | 177 |
|  | 0.15 | 1.18 | 518 | 188 |
|  | 0.20 | 1.56 | 470 | 176 |
|  | 0.25 | 1.94 | 121 | −172 |
|  | 0.30 | 2.31 | 108 | −222 |
|  | 0.35 | 2.68 | 97 | −309 |
|  | 0.40 | 3.04 | 83 | −357 |
| Comp. Ex. 1 | — | — | 390 | 234 |

The coercivity H$_c$ and the magnetic reversal nucleation field H$_n$ were evaluated by the following method. A Kerr effect type magnetometer was used as a measuring device. The environment was set in such a way that the sample temperature became about 25° C., and the Kerr loop was measured by detecting the Kerr rotation angle while applying a magnetic field in the direction perpendicular to the film surface of the sample. The sweeping of the magnetic field was carried out at a constant speed from +1760 kA/m to −1760 kA/m and from −1760 kA/m to +1760 kA/m in 64 seconds.

Figure 3:
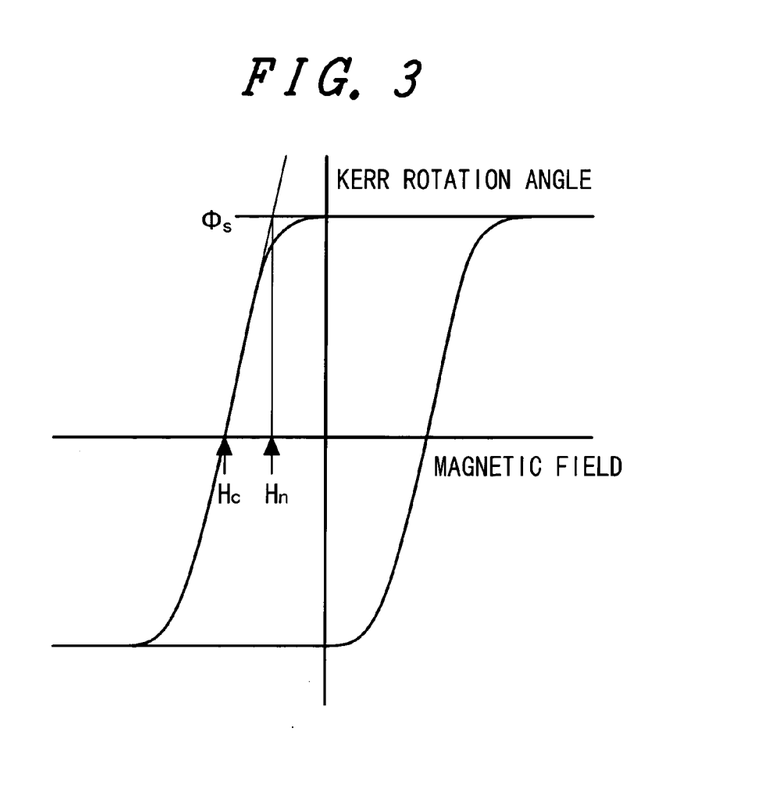
FIG. 3 is a diagram showing the definitions of the coercivity $H_c$ and magnetic reversal nucleation field $H_n$ according to the invention.

Inclination correction and offset correction were performed on the obtained Kerr loop to acquire the coercivity H$_c$ and the magnetic reversal nucleation field H$_n$. Their definitions will be discussed using FIG. 3. H$_c$ was the intersection with the magnetization axis when linear approximation of the Kerr loop from 0.2 $\phi_s$ to −0.2 $\phi_s$ where $\phi_s$ was the saturation value of the Kerr rotation angle was taken, and H$_n$ was the magnetic field when linear approximation of the Kerr loop from 0.9 $\phi_s$ to 0.7 $\phi_s$ was taken and was extrapolated on the 0.9 $\phi_s$ side and the Kerr rotation angle reached $\phi_s$. Here, values used as H$_c$ and H$_n$ were the values, with the positive and negative signs of the magnetic field reversed, obtained through magnetic reversal that would occur when the magnetic field was swept from the plus to the minus as shown in FIG. 3.

FIG. 2 and Table 1 show that high coercivities are obtained when the designed thickness of the SiO$_2$ film is equal to or less than 0.2 nm. Those high coercivities show higher values than those in the case of the mixture formation employed in the comparative example, and it seems that the non-magnetic crystal grain boundary is formed more efficiently in the case of alternate formation than in the case of mixture formation, even if the SiO$_2$ content is the same.

This structure appears to be the structure as shown in FIG. 1A where the magnetic crystal grains are continuous in the thickness direction and are isolated in the direction of the film surface by the crystal grain boundary formed by SiO$_2$, not the structure as shown in FIG. 1B where the crystal grains are subdivided by the SiO$_2$ film in the thickness direction. In case where the designed thickness of the SiO$_2$ film is greater than 0.2 nm, however, it seems that the subdivision of the magnetic crystal grains in the thickness direction degrades the crystal orientation of the recording layer and drastically reduces the magnetic reversal units, resulting in lower coercivity.

That is, a magnetic recording medium suitable for high density recording can be prepared by using the method of alternately forming oxide films with a designed thickness of 0.2 nm or less and magnetic metal films as the method of forming the recording layer of the magnetic recording medium.

EXAMPLE 2

Figure 4A:
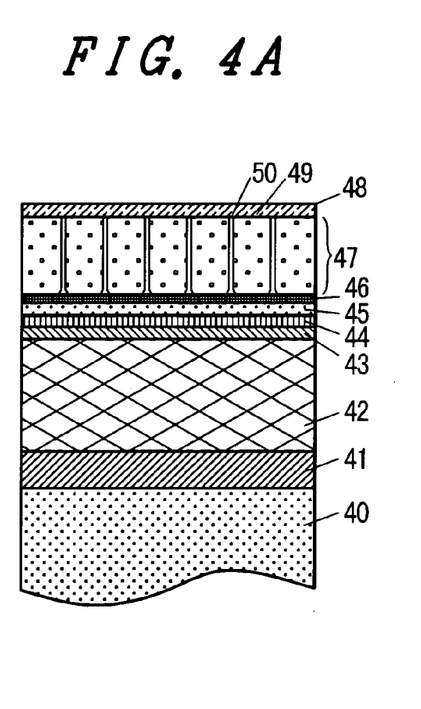
FIGS. 4A and 4B are schematic diagrams showing the cross-sectional structures of a perpendicular magnetic recording medium according to Example 2, FIG. 4A schematically showing the structure which is actually formed while FIG. 4B schematically shows an expected structure according to the manufacturing method of the invention.
Figure 4B:
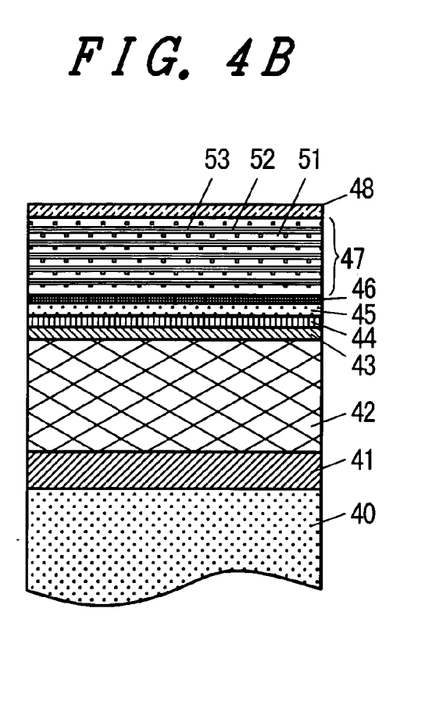

The perpendicular magnetic recording media of Example 2 were prepared with similar film structures to and the same process conditions as those of Example 1 except for the intermediate layer and the recording layer. FIG. 4A is a cross-sectional structural view showing one example of the perpendicular magnetic recording medium according to the invention. The following will discuss the procedures of preparing the intermediate layer and recording layer of this medium. A recording layer 46 was formed by cooling down the substrate until the substrate temperature, which had arisen by heating after the formation of the soft magnetic underlayer, became 100° C. or lower, forming a Pd intermediate layer 43 with a thickness of 1.5 nm, an MgO intermediate layer 44 with a thickness of 1 nm, a Pd intermediate layer 45 with a thickness of 1.5 nm and an intermediate layer 46 of an alloy of Pd and 10 at % of B with a thickness of 3 nm in order, and then repeatedly forming a Pd film, a Co film and an SiO$_2$ film on the resultant structure in the named order. Argon with pressure of 1.0 Pa was used as a sputtering gas at the time of forming the intermediate layers, and argon of 5.6 Pa was used at the time of forming the recording layer. The rotating cathode was used in forming the recording layer as per Example 1. The cathodes to which a Pd target, a Co target and an SiO$_2$ target were attached were discharged individually and were revolved in front of the substrate, thereby alternately forming the lamination film of Pd and Co and the SiO$_2$ film. That is, the cross-sectional structure of the medium that is simply expected from the forming method is shown in FIG. 4B. In this example, the medium was prepared by adjusting the power given to the cathodes in such a way that the designed thicknesses of the Pd film and the Co film respectively became 0.7 nm and 0.3 nm and changing the designed thickness of the SiO$_2$ film from 0.02 nm to 0.33 nm.

As a sample to be compared with Example 2, perpendicular magnetic recording media which differ from Example 2 only in the method of forming the recording layer and are the same in the other film structures and process conditions were prepared as Comparative Example 2. The oxide-added recording layer of Comparative Example 2 was formed by attaching the mixed target with 8 vol % of SiO$_2$ mixed into Co and the Pd target to the rotating cathode and alternately forming them.

Figure 5:
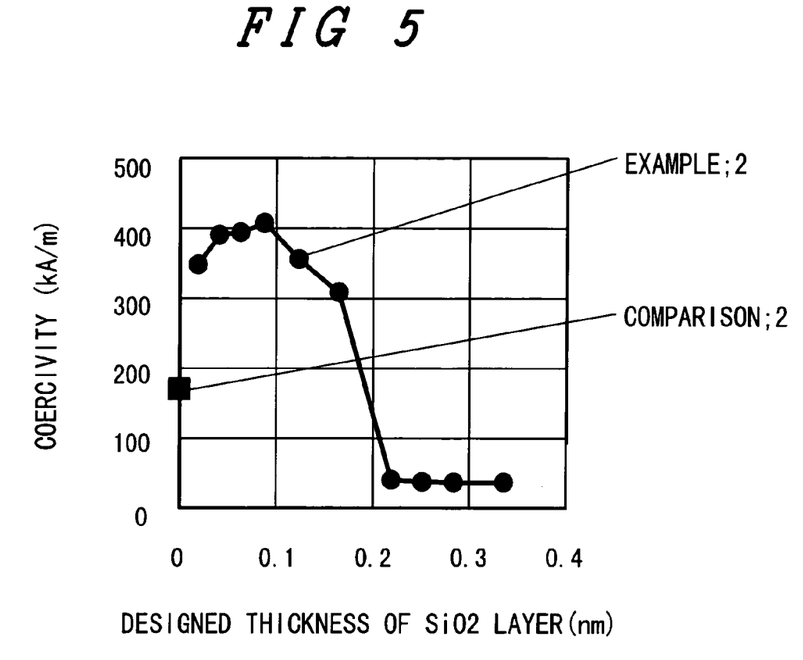
FIG. 5 is a diagram showing the relationship between the designed thicknesses of $SiO_2$ layers and coercivities of perpendicular magnetic recording media according to Example 2 and Comparative Example 2.

The results of plotting the measured coercivities of the recording layers of the media according to Example 2 and Comparative Example 2 are shown in FIG. 5. The method of evaluating the magnetic characteristic is the same as the one used for Example 1.

FIG. 5 and Table 2 show that high coercivities are obtained when the designed thickness of the SiO$_2$ film is equal to or less than 0.2 nm. Those high coercivities show higher values than those in the comparative example, and it seems that the non-magnetic crystal grain boundary is formed more efficiently in the case where SiO$_2$ is formed separately than in the case where SiO$_2$ is mixed in Co.

TABLE 2

| Designed thickness of SiO$_2$ film (nm) | Designed thickness of Ru layer (nm) | Si Content (at %) | Coercivity Hc (kA/m) | Hn/Hc |
|---|---|---|---|---|
| 0 | | 0 | 390 | 0.60 |
| 0.05 | 2.50 | 0.6 | 418 | 0.30 |
| 0.10 | 2.50 | 1.3 | 427 | 0.31 |
| 0.16 | 2.50 | 1.9 | 440 | 0.29 |
| 0.22 | 2.50 | 2.6 | 106 | −1.08 |
| 0.31 | 2.50 | 3.6 | 90 | −1.56 |
| 0.37 | 2.50 | 4.3 | 78 | −1.80 |
| 0.04 | 0.60 | 1.9 | 438 | 0.33 |
| 0.05 | 0.60 | 2.6 | 454 | 0.32 |
| 0.07 | 0.60 | 3.6 | 464 | 0.33 |
| 0.09 | 0.60 | 4.3 | 467 | 0.29 |
| 0.11 | 0.60 | 5.5 | 211 | −0.09 |
| 0.13 | 0.60 | 6.3 | 191 | −0.20 |
| 0.16 | 0.60 | 7.5 | 182 | −0.26 |

This structure appears to be the structure as shown in FIG. 4A where the crystal grains comprised of the lamination layer of Co and Pd are continuous in the thickness direction and are isolated in the direction of the film surface by the crystal grain boundary formed by SiO$_2$, not the structure as shown in FIG. 4B where the crystal grains are subdivided by the SiO$_2$ film in the thickness direction. In case where the designed thickness of the SiO$_2$ film is greater than 0.2 nm, however, it seems that the subdivision of the magnetic crystal grains in the thickness direction degrades the crystal orientation of the recording layer and drastically reduces the magnetic reversal units, resulting in lower coercivity.

That is, a perpendicular magnetic recording medium suitable for high density recording can be prepared by using the method of alternately forming oxide films with a designed thickness of 0.2 nm or less and magnetic films as the method of forming the recording layer of the perpendicular magnetic recording medium.

EXAMPLE 3

The perpendicular magnetic recording media of Example 3 were prepared with similar film structures to and the same process conditions as those of Example 1 except for the intermediate layer and the recording layer.

Figure 6A:
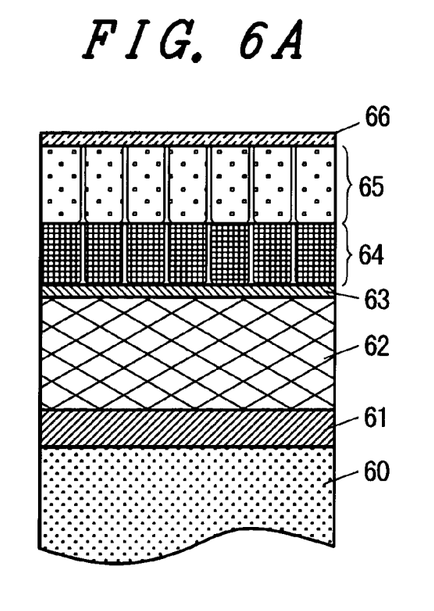
FIGS. 6A and 6B are schematic diagrams showing the cross-sectional structures of a perpendicular magnetic recording medium according to Example 3, FIG. 6A schematically showing the structure which is actually formed while FIG. 6B schematically shows an expected structure according to the manufacturing method of the invention.

FIG. 6A is a cross-sectional structural view showing one example of the perpendicular magnetic recording medium according to the invention. The following will discuss the procedures of preparing the intermediate layer and recording layer of this medium.

After the substrate was cooled down until the substrate temperature, which had arisen by heating after the formation of the soft magnetic underlayer, became 100° C. or lower, a Ta intermediate layer 63 with a thickness of 1 nm and an intermediate layer 64 with a thickness of 20 nm comprised of a mixture of Ru and Si oxide were formed, on which a recording layer 65 with a thickness of 14 nm made of an alloy of Co, 13 at % of Cr and 14 at % of Pt and an Si oxide and further a carbon protective layer 66 with a thickness of 4 nm were formed.

Argon was used as a sputtering gas and the pressure was set to 1.0 Pa at the time of forming the Ta film and 2.2 Pa at the time of forming the film having a mixture of Ru and Si oxide and at the time of forming the recording layer. In case of forming the recording layer, an argon-oxygen gas having 1% of oxygen mixed into argon was used.

In this example, the rotating cathode was used for the formation of the intermediate layer, not the formation of recording layer. The cathodes to which a Ru target and an SiO$_2$ target were attached were discharged individually and were revolved in front of the substrate, thereby alternately forming the Ru film and SiO$_2$ film.

Figure 6B:
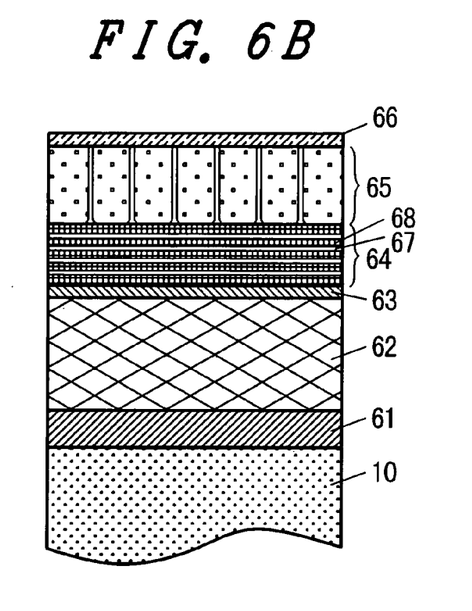

That is, the cross-sectional structure of the medium that is simply expected from the forming method is shown in FIG. 6B. The medium was prepared by changing the designed thickness of the SiO$_2$ film from 0.02 nm to 0.40 nm. The recording layer was formed by RF sputtering using the mixed target with 12.5 vol % of SiO$_2$ mixed into an alloy of Co, 13 at % of Cr and 14 at % of Pt, as per Comparative Example 1. That is, the oxide-added recording layer was formed by mixture formation, not alternate formation. All of the recording layers of this example were formed under the same conditions.

The Ru—SiO$_2$ mixed film was prepared by changing the layer structure as follows. The formation of those thin layers was repeated until the total thickness of the Ru—SiO$_2$ mixed film became about 20 nm by setting the designed thickness of the Ru film to 2.5 nm or 0.6 nm and changing the designed thickness of the SiO$_2$ film from 0 nm to 0.37 nm.

Table 2 show the SiO$_2$ content of the media of Example 3 prepared in the above-described manner, the coercivity H$_c$ of the recording layer and the ratio H$_n$/H$_c$ of the magnetic reversal nucleation field H$_n$ to the coercivity H$_c$. The evaluation of those magnetic characteristics was carried out in the same way as done for Example 1. With the designed thickness of the Ru film fixed to 2.5 nm and the designed thickness of the SiO$_2$ film varied, high coercivities are obtained only when the designed thickness of the SiO$_2$ film is equal to or less than 0.2 nm. Those high coercivities show higher values than those in the case where SiO$_2$ is not mixed into Ru, and it seems that SiO$_2$ forms the grain boundary of the Ru crystal grains.

As the crystal orientation of the recording layer is deteriorated significantly, rapidly lowering the coercivity when the designed thickness of the SiO$_2$ film exceeds 0.2 nm, the SiO$_2$ film thicker than 0.2 nm seems to cover the surface of the Ru film and disturb the crystal orientation.

When the designed thickness of the SiO$_2$ film was changed with the designed thickness of the Ru film fixed to 0.6 nm, the coercivity rapidly decreased when the designed thickness of the Ru film is 0.11 nm or greater. At this time, 5.5 at % of SiO$_2$ is contained and the excessive SiO$_2$ appears to disturb the crystal orientation. The Ru—SiO$_2$ mixed film was prepared by mixture formation by using a target with 9 mol % of SiO$_2$ mixed into Ru and the magnetic characteristic of the medium was similarly evaluated. The coercivity H$_c$ was 106 kA/m. In other words, the crystal grain boundary of SiO$_2$ is formed more efficiently in the case of alternate formation of mixed films of Ru and SiO$_2$ than in the case of mixture formation.

This structure appears to be the structure as shown in FIG. 6A where the magnetic crystal grains are continuous in the thickness direction and are isolated in the direction of the film surface by the crystal grain boundary formed by SiO$_2$, not the structure as shown in FIG. 6B where the crystal grains are subdivided by the SiO$_2$ film in the thickness direction. In case where the designed thickness of the SiO$_2$ film is greater than 0.2 nm, however, it seems that the subdivision of the magnetic crystal grains in the thickness direction degrades the crystal orientation of the recording layer, resulting in lower coercivity.

That is, a magnetic recording medium suitable for high density recording can be prepared by using the method of alternately forming oxide films with a designed thickness of 0.2 nm or less and metal films as the method of forming the intermediate layer of the magnetic recording medium.

EXAMPLE 4

The perpendicular magnetic recording media of this example were prepared with similar film structures to and the same process conditions as those of Example 1, except that the thickness of the recording layer was set to 16 nm and the composition of the Co—Cr—Pt alloy film used in the recording layer was Co, 17 at % of Cr and 14 at % of Pt. In this example, a sample was prepared by fixing the designed thickness of the SiO$_2$ film to 0.1 nm and changing the amount of SiO$_2$ to be mixed in the Co—Cr—Pt alloy film of the recording layer by varying the designed thickness of the Co—Cr—Pt alloy film in the alternate formation.

As a sample to be compared with Example 4, perpendicular magnetic recording media which differ from Example 4 only in the method of forming the recording layer and are the same in the other film structures and process conditions were prepared as Comparative Example 4. The recording layer of Comparative Example 4 was formed by RF sputtering using a target which had SiO$_2$ mixed into the alloy of Co, 17 at % of Cr and 14 at % of Pt attached to an ordinary cathode, not the rotating cathode. That is, the recording layer with an oxide added by mixture formation, not alternate formation, was prepared. The sample was prepared in the range where the mixture ratio of SiO$_2$ varied from 10 mol % to 25 mol %.

Table 3 show the SiO$_2$ contents of the media of Example 4 and Comparative Example 4, the magnetic characteristics and the medium S/N. The Si contents were measured by an X-ray photoelectron spectroscopy apparatus. The evaluation of those magnetic characteristics was carried out in the same way as done for Example 1. The evaluation of the medium S/N was executed by spin-stand. The head that was used in the evaluation was a composite magnetic head comprising a reading device using the giant magnetoresistive effect with a track width of 120 nm and a single pole type writing device with a track width of 150 nm. The reading output and noise were measured under the conditions of the peripheral speed of 10 m/s, the skew angle of 0 degree and the magnetic spacing of about 15 nm. The medium S/N was evaluated by the ratio of the isolated wave reading output at the linear recording density of 1970 fr/mm (50 kFCI) to medium noise at the linear recording density of 23620 fr/mm (600 kFCI).

TABLE 3

| | Si content in recording layer (at %) | Coercivity H$_c$ (kA/m) | Hn/Hc | Media S/N (dB) |
|---|---|---|---|---|
| Example 4 | 0.5 | 150 | −0.13 | 17.1 |
| | 1.1 | 283 | 0.15 | 19.0 |
| | 1.6 | 393 | 0.34 | 19.1 |
| | 2.2 | 416 | 0.33 | 19.2 |
| | 2.8 | 471 | 0.36 | 19.4 |
| | 3.4 | 522 | 0.36 | 19.5 |
| | 4.1 | 490 | 0.29 | 19.5 |
| | 4.4 | 438 | 0.16 | 19.3 |
| | 4.7 | 169 | −0.88 | 17.2 |
| | 5.4 | 116 | −1.37 | 15.8 |
| | 6.1 | 98 | −1.60 | 15.2 |
| Comp. Ex. 4 | 2.8 | 253 | 0.81 | 16.9 |
| | d3.6 | 305 | 0.78 | 17.5 |
| | 4.4 | 353 | 0.71 | 17.9 |
| | 5.2 | 419 | 0.64 | 17.6 |
| | 6.1 | 430 | 0.56 | 17.4 |
| | 7.0 | 219 | 0.33 | 16.7 |
| | 8.0 | 148 | 0.27 | 15.7 |

Figure 7:
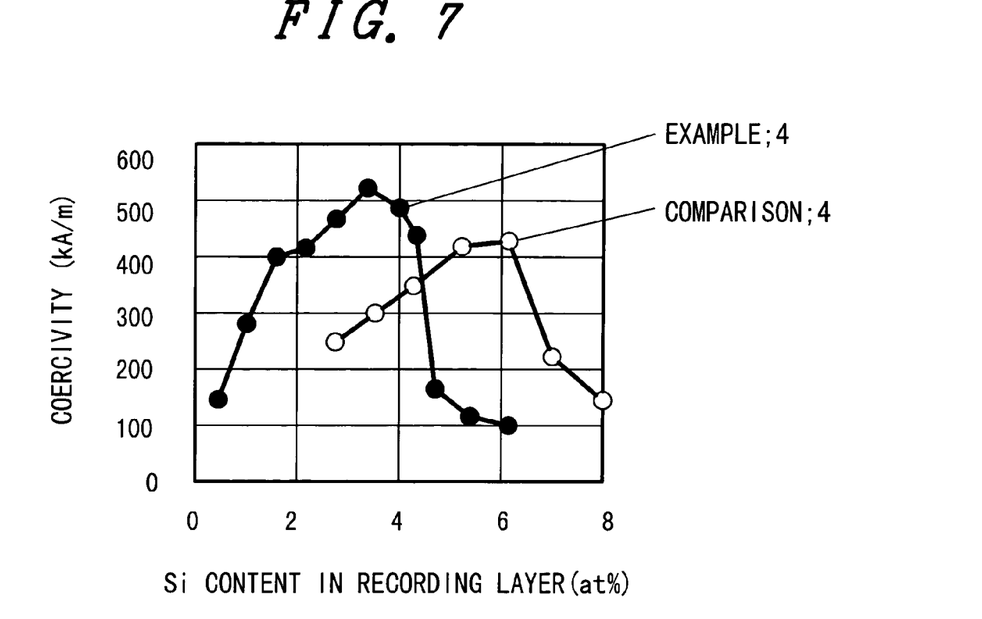
FIG. 7 is a diagram showing the relationship between Si contents in the recording layers and coercivities of perpendicular magnetic recording media according to Example 4 and Comparative Example 4.

FIG. 7 shows the Si content dependency of the coercivity H$_c$ measured for the media of Example 4 and Comparative Example 4. The results of this example showed that the coercivity of 300 kA/m or greater was acquired when the Si content in the recording layer was 1 at % or greater and 4.5 at % or less.

Figure 8:
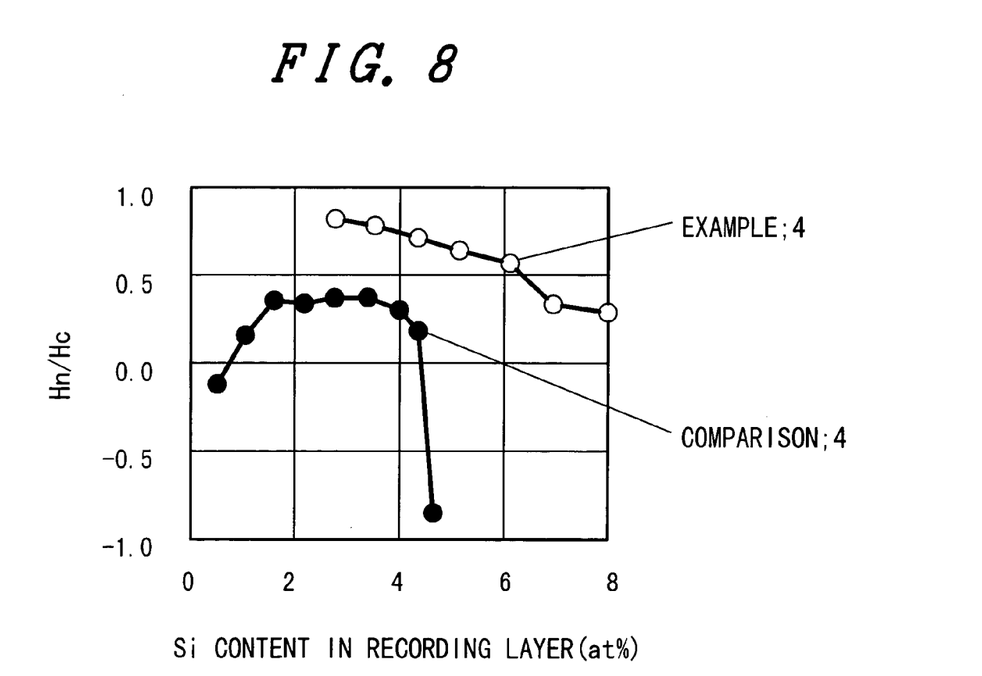
FIG. 8 is a diagram showing the relationship between Si contents in the recording layers and $H_n/H_c$ of perpendicular magnetic recording media according to Example 4 and Comparative Example 4.

FIG. 8 shows the Si content dependency of H$_n$/H$_c$ measured for the media of Example 4 and Comparative Example 4. For the media of this example, H$_n$/H$_c$ of 0 and greater and 0.5 or less was acquired when the Si content in the recording layer was 1 at % or greater and 4.5 at % or less.

Figure 9:
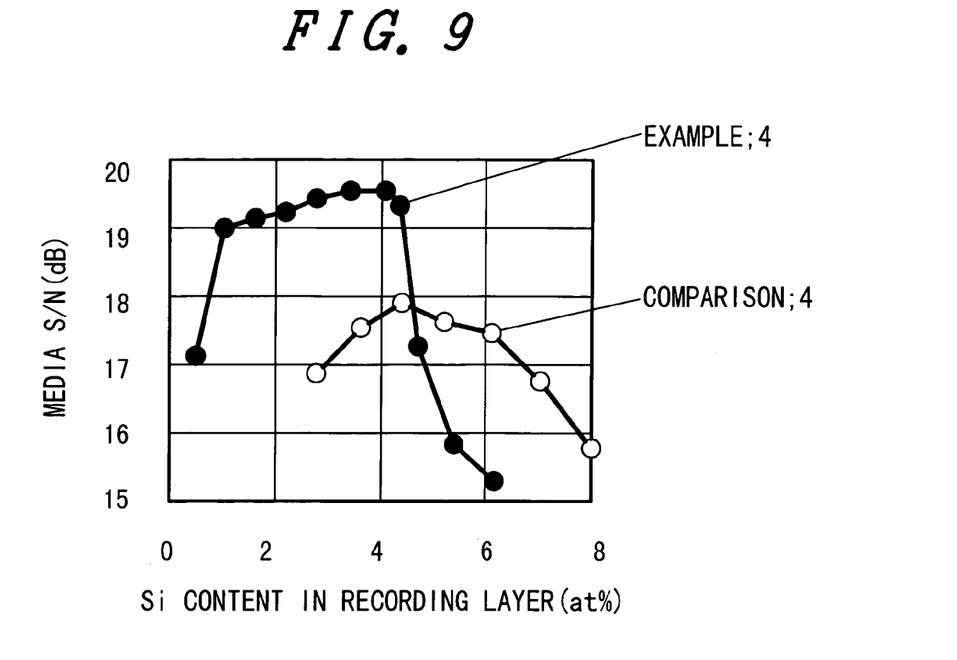
FIG. 9 is a diagram showing the relationship between Si contents in the recording layers and medium S/N of perpendicular magnetic recording media according to Example 4 and Comparative Example 4.

FIG. 9 shows the Si content dependency of medium S/N evaluated for the media of Example 4 and Comparative Example 4. For the media of this example, high S/N of 19 dB or greater was acquired when the Si content in the recording layer was 1 at % or greater and 4.5 at % or less. It is seen from those results that the media prepared according to Example 4 differ significantly from the media prepared according to Comparative Example 4 in characteristic and tendency, which seem to be originated from the differences in the separation structure and impurity concentration of the crystal grains between the example and the comparative example. H$_c$ and H$_n$/H$_c$ seem to be a good combination as parameters which simply represent those differences.

Figure 10:
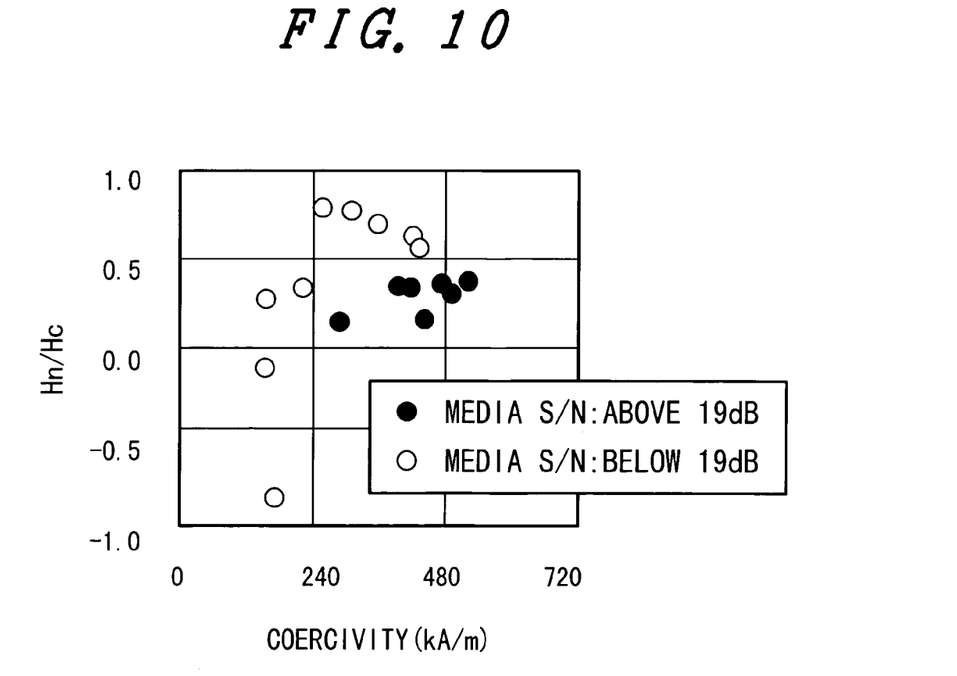
FIG. 10 is a diagram showing the relationship between coercivities, $H_n/H_c$ and medium S/N of the recording layers of perpendicular magnetic recording media according to Example 4 and Comparative Example 4.

FIG. 10 shows media with medium S/N of 19 dB or greater as a black circular mark and a media with medium S/N of 19 dB or less as a white circular mark with H$_c$ taken on the horizontal axis and H$_n$/H$_c$ taken on the vertical axis. High S/N suitable for high density recording can be acquired when H$_c$ is equal to or greater than 240 kA/m and H$_n$/H$_c$ is 0 or greater and is 0.5 or less. That is, high S/N suitable for high density recording can be acquired by preparing a magnetic recording medium having a recording layer formed in such a way that the ratio of a non-magnetic element constituting the crystal grain boundary of the recording layer is 1 at % or greater and 4.5 at % or less and with H$_c$ equal to or greater than 240 kA/m and H$_n$/H$_c$ is 0 or greater and 0.5 or less.

Similar results to those of this example can be acquired even in case where the recording layer having Pd, Co and $SiO_2$ formed in the named order as done in Example 2 is used. That is, high S/N can be acquired in case where the Si content is 1 at % or greater and 4.5 at % or less, and the then magnetic characteristics are $H_c$ of 240 kA/m or greater and $H_n/H_c$ of 0 or greater and 0.5 or less.

Results similar to those of this example can be acquired even in case where the intermediate layer having Ru and $SiO_2$ formed alternately as done in Example 3 is used. That is, high S/N can be acquired in case where the Si content in the intermediate layer is 1 at % or greater and 4.5 at % or less, and the then magnetic characteristics of the recording layer are $H_c$ of 240 kA/m or greater and $H_n/H_c$ of 0 or greater and 0.5 or less.

Similar results were acquired even when MgO or $Al_2O_3$ besides $SiO_2$ is used as an oxide to be added to the recording layer or the intermediate layer. In case of using MgO, for example, high S/N could be acquired when the Mg content in the recording layer or the intermediate layer is 1 at % or greater and 4.5 at % or less.

In short, the invention can provide a perpendicular magnetic recording medium which can accelerate magnetic isolation of the crystal grains of the recording layer of the perpendicular magnetic recording medium without impairing the thermal stability and the crystal orientation of the perpendicular magnetic recording medium and which has lower medium noise and has high recording resolution and is insusceptible to thermal fluctuation.

What is claimed is:

1. A perpendicular magnetic recording medium having a recording layer provided on a substrate via an underlayer, wherein
   said underlayer is comprised of crystal grains consisting essentially of Ru and a-grain boundaries consisting of non-magnetic elements and oxygen,
   in those elements which constitute said grain boundaries, an amount of content of said non-magnetic element contained most in said grain boundaries besides oxygen over the entire recording layer is 1 at % or greater and 4.5 at % or less, and
   a ratio $H_n/H_c$ of a nucleation field for magnetic reversal $H_n$ to coercivity $H_c$ of said recording layer is 0 or greater and 0.5 or less.

2. The perpendicular magnetic recording medium according to claim 1, wherein said non-magnetic element is Si.

3. The perpendicular magnetic recording medium according to claim 1, wherein said recording layer consists essentially of Co and Pt or Pd.

4. The perpendicular magnetic recording medium according to claim 1, wherein said coercivity of said recording layer is 240 kA/m or greater.

5. The perpendicular magnetic recording medium according to claim 1, wherein said underlayer is a multilayer.

* * * * *